(12) United States Patent
Kerrigan et al.

(10) Patent No.: US 6,233,142 B1
(45) Date of Patent: May 15, 2001

(54) MECHANICAL ARCHITECTURE OF SUPPORTING A HARD DISK DRIVE INTO A FEATURE CARD SLOT IN A NETWORK COMPUTER

(75) Inventors: Brian Michael Kerrigan; Howard Carl Tanner, both of Austin; Jeffrey William Young, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/174,647

(22) Filed: Oct. 19, 1998

(51) Int. Cl.[7] .............................. G06F 1/16; H05K 5/02; H05K 7/14
(52) U.S. Cl. .................... 361/685; 361/684; 312/223.2
(58) Field of Search .................................... 361/683, 684, 361/685, 724; 312/223.2

(56) References Cited

U.S. PATENT DOCUMENTS

| | | | |
|---|---|---|---|
| 5,224,019 | * 6/1993 | Wong et al. | 361/685 |
| 5,271,152 | * 12/1993 | Murphy . | |
| 5,546,276 | * 8/1996 | Cutts et al. | 361/724 |
| 6,058,007 | * 5/2000 | Eckert et al. | 361/684 |

* cited by examiner

Primary Examiner—Lynn D. Feild
(74) Attorney, Agent, or Firm—Casimer K. Salys; Felsman, Bradley, Vaden, Gunter & Dillon, LLP

(57) ABSTRACT

A small network computer has a chassis which is mounted within a housing. A variety of electronic components are mounted to the chassis and a pair of feature card slots are located in a tailstock portion of the chassis. A full-sized 3.5 inch hard disk drive is mounted to a flat bracket in one of the feature card slots. The bracket inserts into the tailstock on one end and is fastened to the chassis on an opposite end.

8 Claims, 5 Drawing Sheets

MECHANICAL ARCHITECTURE OF SUPPORTING A HARD DISK DRIVE INTO A FEATURE CARD SLOT IN A NETWORK COMPUTER

TECHNICAL FIELD

This invention relates in general to electronic computers and in particular to supporting a hard disk drive into a network computer.

BACKGROUND ART

Although network computers are significantly smaller than personal computers, they contain a number of similar electronic components such as a motherboard, a hard disk drive, connectors, feature card slots and the like. Each of the components is rigidly mounted to an internal frame or chassis. A thin profile, external housing or enclosure is removably attached to the chassis for allowing the user access to the components. The enclosure also protects the exposed components from physical contact and shields the components from electromagnetic interference (EMI).

Until now, a standard density 3.5×1 inch hard disk drive has been geometrically incompatible with small network computers. Instead, computer designers have selected smaller, more expensive drives with comparable densities such as a 2.5 inch drive. Smaller drives were also selected to avoid sacrificing one of the feature card slots in the computer. However, in some designs even a smaller hard disk drive required computer designers to sacrifice a feature card slot. For these designs, conventional computer architecture taught the use of a voluminous metal shadow box that the ISA or PCI cards could mount to. Although shadow boxes and smaller, more expensive drives are workable with network computers, an improved network computer design which is compatible with an unboxed conventional drive is desirable.

DISCLOSURE OF THE INVENTION

A small network computer has a chassis which is mounted within a housing. A variety of electronic components are mounted to the chassis and a pair of feature card slots are located in a tailstock portion of the chassis. A full-sized 3.5 inch hard disk drive is mounted to a flat bracket in one of the feature card slots. The bracket inserts into the tailstock on one end and is fastened to the chassis on an opposite end.

BEST MODE FOR CARRYING OUT THE INVENTION

Figure 1:
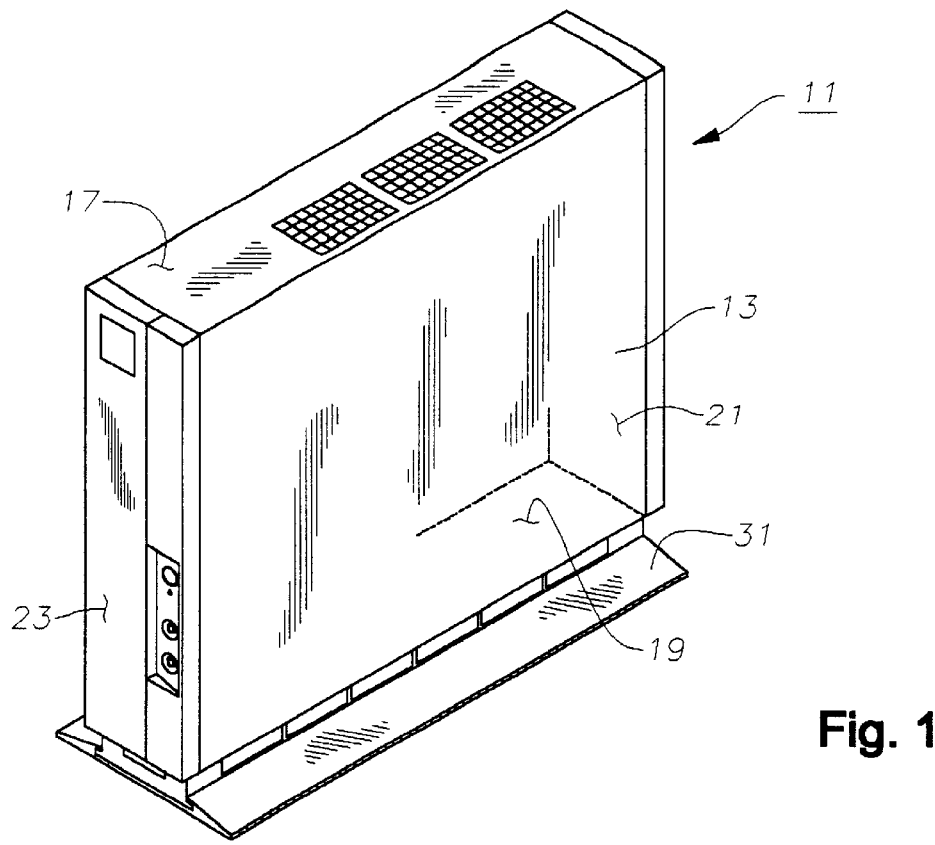
FIG. 1 is a front isometric view of a computer constructed in accordance with the invention.
Figure 2:
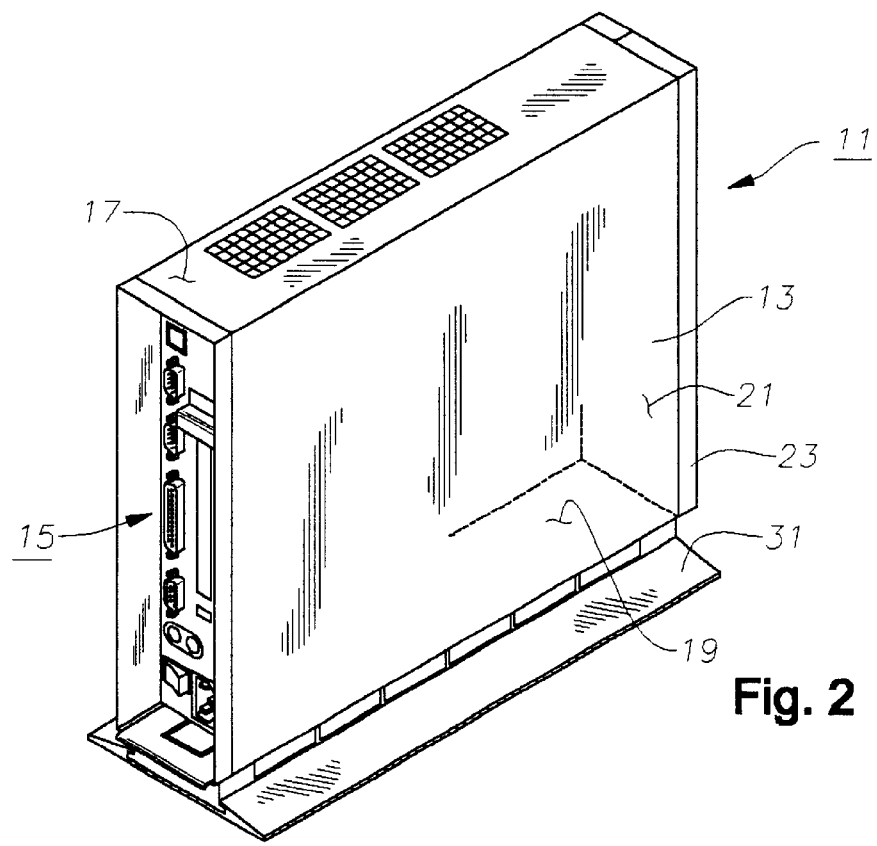
FIG. 2 is a rear isometric view of the computer of FIG. 1.

Referring to FIGS. 1 and 2, a network computer 11 is shown. Computer 11 has an external metal housing or enclosure 13 and an internal metal frame or chassis 15. Enclosure 13 is essentially a five-sided rectangular box with an opening on a rearward end. Enclosure 13 has a top panel 17, a bottom panel 19, and two side panels 21, all of which are formed from a single sheet of metal which is bent to form four corners. A front panel 23 is integrally joined to the forward end of enclosure 13. A base or pedestal 31 is mounted to the lower surface of bottom panel 19.

Figure 3:
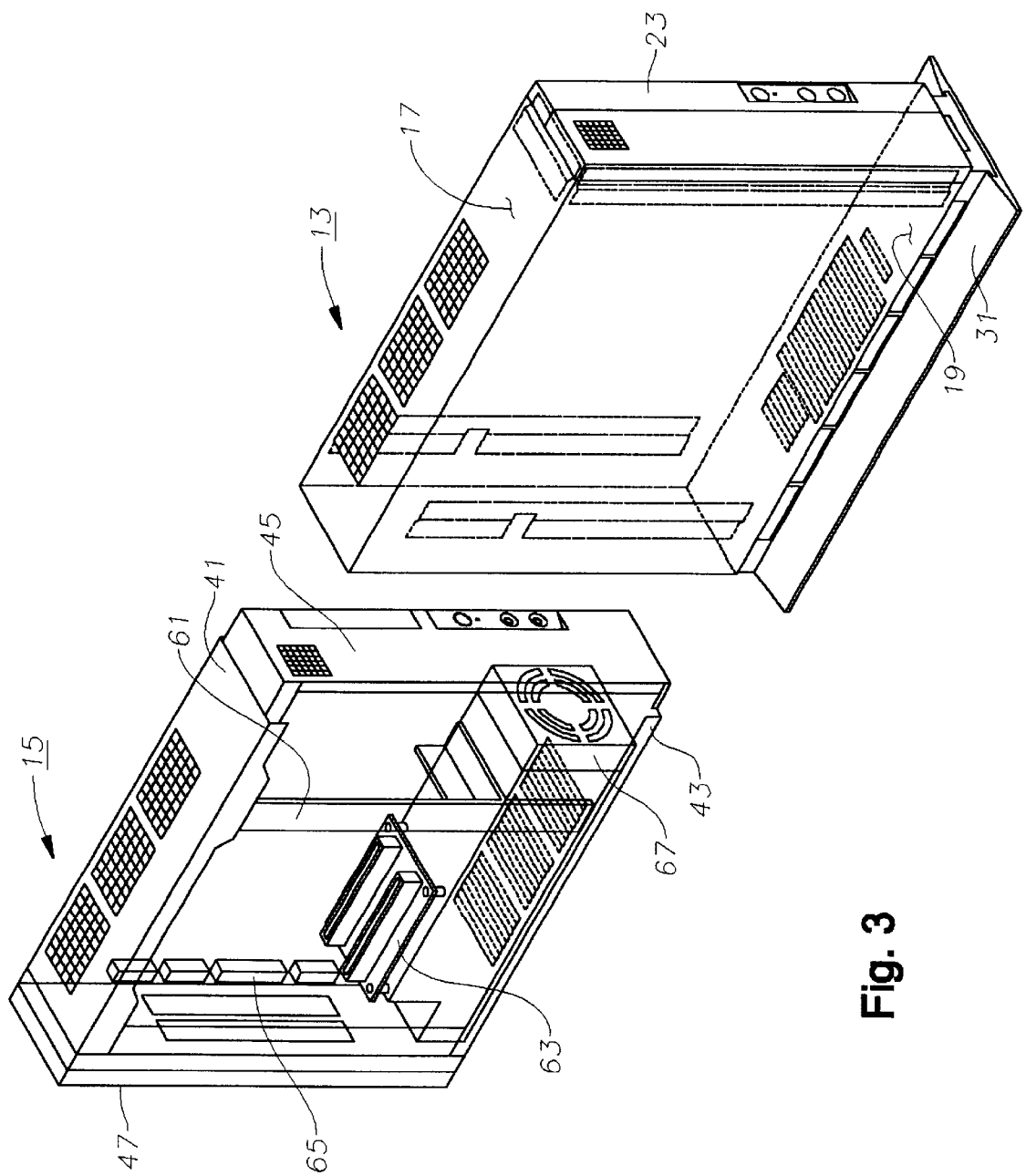
FIG. 3 is a front isometric, partially transparent view of the computer of FIG. 1 shown with its chassis removed from its enclosure.

As shown in FIG. 3, chassis 15 is slidably mounted within enclosure 13. Chassis 15 has a rectangular perimeter of four wall-like frame members including a top 41, a bottom 43 and front and rear ends 45, 47. This configuration allows the vertical sides of chassis 15 to remain open and uncovered. A strut 61 is mounted to and extends vertically between top 41 and bottom 43. Chassis 15 also has a plurality of electronic components such as printed circuit boards 63, connectors 65, a ventilation fan 67 and the like mounted to it. For simplicity, only a few of the components of computer 11 are illustrated.

Figure 4:
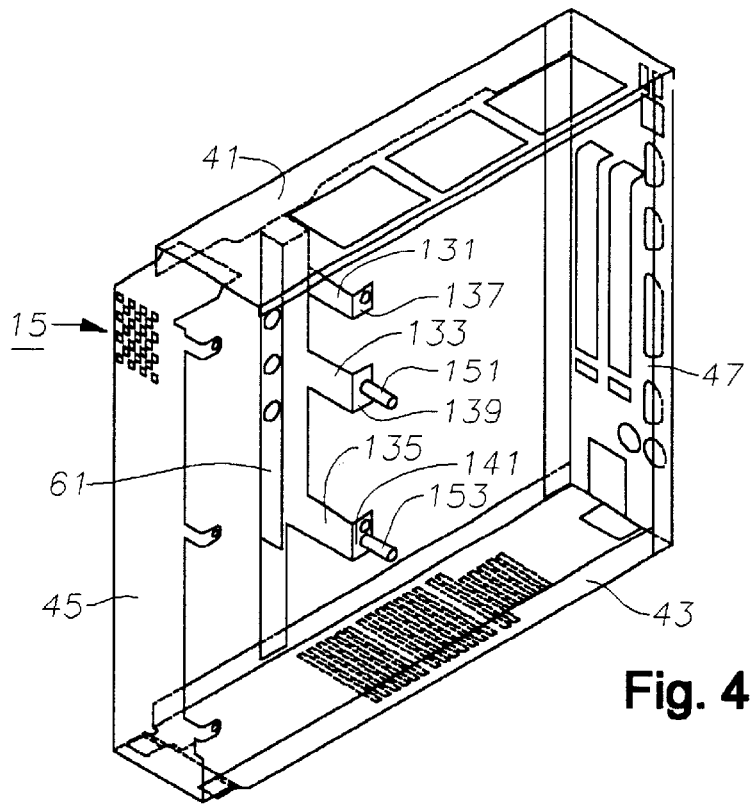
FIG. 4 is a front isometric view of the chassis of FIG. 3 shown with its electronic components removed.
Figure 5:
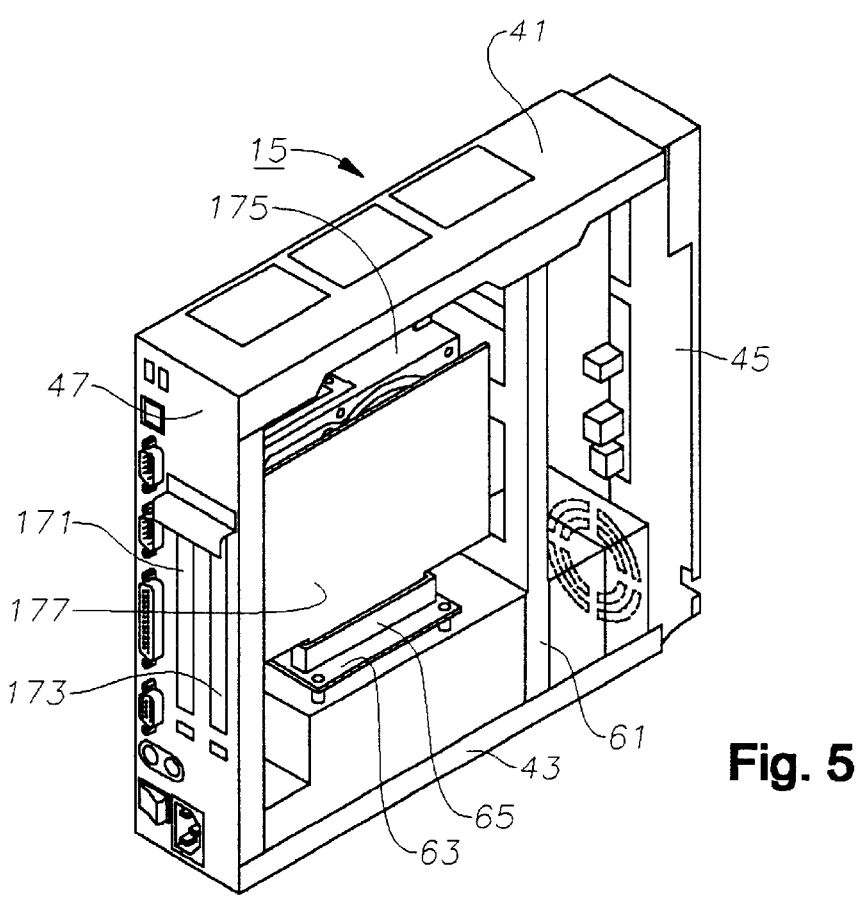
FIG. 5 is a rear isometric view of the chassis of FIG. 3 shown with its electronic components.
Figure 6:
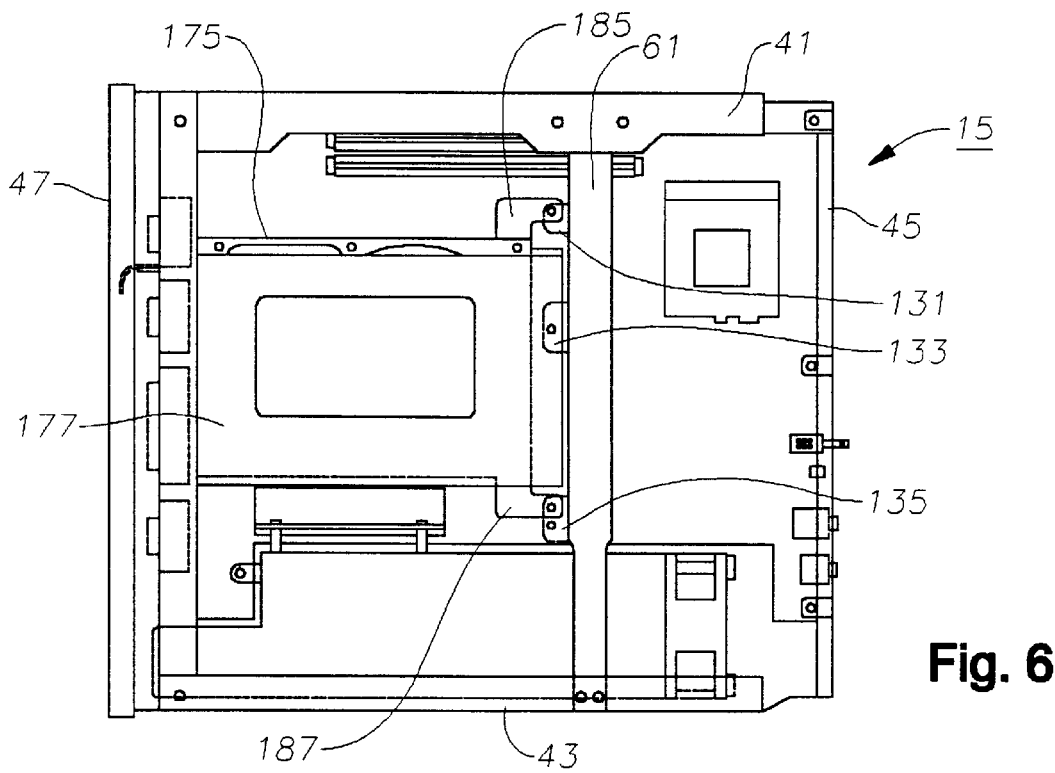
FIG. 6 is a side view of the chassis of FIG. 5 with a PCI card installed.
Figure 7:
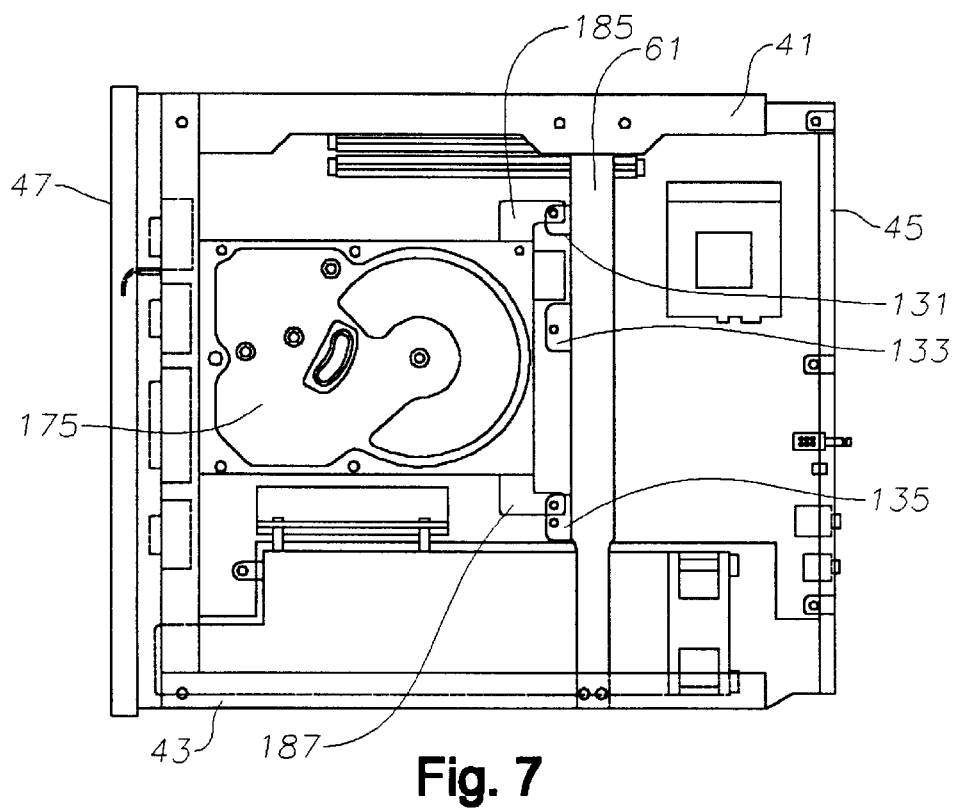
FIG. 7 is a side view of the chassis of FIG. 5 with the PCI card of FIG. 6 removed.

Referring now to FIG. 4, strut 61 is shown in greater detail. Strut 61 has a brace-type body which extends vertically between top 41 and bottom 43 on one side. Strut 61 also has three perpendicular legs 131, 133, 135 which extend horizontally from its body. Leg 131 is shorter than legs 133, 135. Each leg 131, 133, 135 has a small perpendicular flange 137, 139, 141, respectively, on its distal end. Each leg 133 and 135 also has an extension or pin 151, 153 which extends horizontally from its distal end beyond flanges 139, 141, respectively.

As shown in FIGS. 5–8, rear end 47 of chassis 15 has a pair of PCI card slots 171, 173 which are parallel and spaced-apart from each other. In the configuration shown, a hard disk drive 175 aligns slot 171 and a PCI card 177 aligns with slot 173. Drive 175 is a standard density, full-sized 3.5×1 inch hard disk drive.

Figure 8:
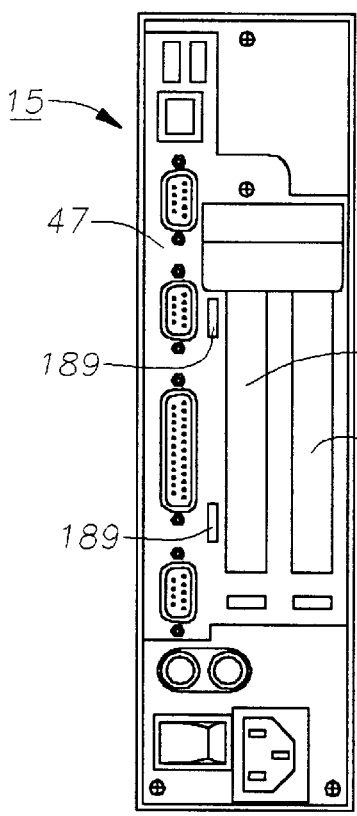
FIG. 8 is an end view of the chassis of FIG. 5.
Figure 9:
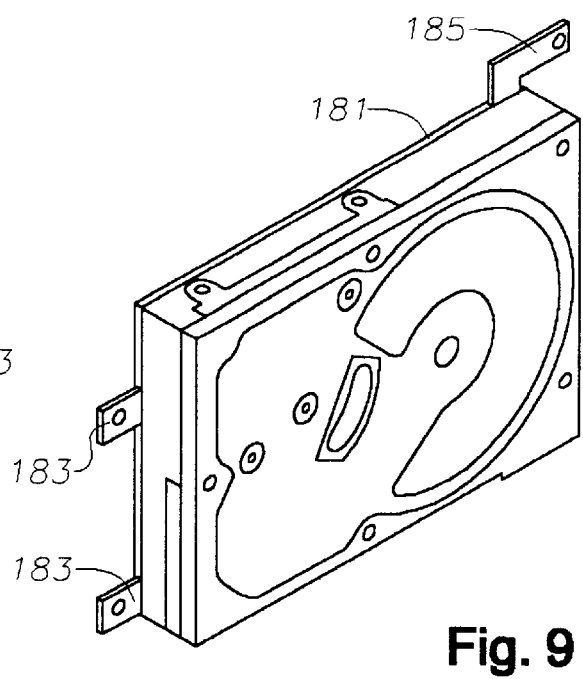
FIG. 9 is an isometric view of a hard disk drive from the chassis of FIG. 5.

A generally flat support plate 181 is fastened to drive 175 and used as an interface between drive 175 and chassis 15. Plate 181 has two flat tabs 183 protruding from a rearward end, and two generally L-shaped flat tabs 185, 187 extending from the sides of its forward end. Tabs 183 are closely received by and slidably engage rectangular slots 189 located in rear end 47 adjacent to PCI card slot 171 (FIG. 8). Tabs 185, 187 fasten directly to legs 131, 135, respectively, and are provided for supporting one end of drive 175 on chassis 15.

In operation, enclosure 13 closely receives chassis 15 such that top panel 17 and bottom panel 19 slidably abut top 41 and bottom 43. In addition, the vertical side edge portions of top 41 and bottom 43 slidably engage side panels 21 to eliminate excessive movement between chassis 15 and enclosure 13. As shown in FIGS. 5–8, plate 181 is mounted to hard disk drive 175 and rigidly supports drive 175 adjacent to the PCI card slot 171 in chassis 15. The forward end of drive 175 is supported by strut 61 via tabs 185 and legs 131, 135, while the rearward end of drive 175 is supported in rear end 47 by tabs 183 in slots 189.

The invention has advantages. This design allows the use of an inexpensive, full-sized 3.5 inch hard disk drive in a thin profile, network computer without the use of a bulky shadow box. Although the computer uses a full-sized drive, one PCI card slot remains available for use.

While the invention has been shown or described in only some of its forms, it should be apparent to those skilled in the art that it is not so limited, but is susceptible to various changes without departing from the scope of the invention.

I claim:

1. A network computer, comprising:

an enclosure;

a frame mounted within the enclosure and having frame members;

a rear panel mounted to the frame and having a pair of feature card slots which are externally accessible;

a single plate mounted to the frame adjacent to one of the feature card slots in the rear panel; and a full-sized hard disk drive mounted to the plate and aligned with said one of the feature card slots, and free of interference with the use of the other of the feature card slots.

2. The network computer of claim 1 wherein the plate has rearward extending tabs which are closely received by and slidably engage mounting slits in the rear panel.

3. The network computer of claim 1 wherein the plate is also mounted to the rear panel.

4. A network computer, comprising:

an enclosure;

a frame mounted within the enclosure and having frame members;

a rear panel mounted to the frame and having a pair of feature card slots that are externally accessible;

a circuit board having a plurality of electronic components and being mounted to the frame;

a plate mounted to the frame adjacent to one of the feature card slots in the rear panel;

a full-sized hard disk drive mounted to the plate, the disk drive and the plate positioned so as to be free of interference with the use of the other of the feature card slots;

a strut member extending between the frame members of the frame; and wherein the plate has forward extending tabs which fasten to legs extending from the strut member.

5. A network computer, comprising:

an enclosure;

a frame mounted within the enclosure and having frame members, a strut extending substantially perpendicular to the frame members, and a rear panel with a mounting slit and a pair of feature card slots which are externally accessible;

a single plate mounted to the frame and to the rear panel, the plate being substantially parallel to the frame members of the frame, and the plate having a rearward extending tab which engages the rear panel adjacent to one of the feature card slots; and a full-sized hard disk drive mounted to the plate and aligned with said one of the feature card slots, and free of interference with the use of the other of the feature card slots.

6. The network computer of claim 5 wherein the tab on the plate is closely received by and slidably engages the mounting slit in the rear panel.

7. A network computer comprising:

an enclosure;

a frame mounted within the enclosure and having frame members, a strut extending substantially perpendicular to the frame members, and a rear panel with a mounting slit and a pair of feature card slots which are externally accessible;

a circuit board mounted to the frame and having a plurality of electronic components;

a plate mounted to the frame and to the rear panel, the plate being substantially parallel to the frame members of the frame, and the plate having a rearward extending tab which engages the rear panel adjacent to one of the feature card slots;

a full-sized hard disk drive mounted to the plate, the disk drive and the plate positioned so as to be free of interference with the use of the other of the feature card slots; and wherein the plate has forward extending tabs which fasten to the strut.

8. A network computer, comprising:

an enclosure;

a frame mounted within the enclosure and having, frame members, a strut extending substantially perpendicular to the frame members, and a rear panel with mounting slits and a pair of feature card slots which are externally accessible;

a circuit board mounted to the frame and having a plurality of electronic components;

a plate mounted to the frame and to the rear panel, the plate being substantially parallel to the frame members of the frame, and the plate having forward extending tabs which fasten to the strut and rearward extending tabs which are closely received by and slidably engage the mounting slits in the rear panel adjacent to one of the feature card slots; and a full-sized hard disk drive mounted to the plate, the disk drive and the plate positioned so as to be free of interference with the use of the other of the feature card slots.

* * * * *